Patented Dec. 31, 1935

2,026,289

UNITED STATES PATENT OFFICE 2,026,289

PROCESS FOR THE MANUFACTURE OF PARA DIKETOCAMPHAN CARBOXYLIC ACID AND HYDROXY-OXO-CAMPHAN CARBOXYLIC ACID

Kenzo Tamura, Gyokujo Kihara, Yasuhiko Asahina, and Morizo Ishidate, Tokyo, Japan No Drawing. Application May 29, 1933, Serial No. 673,561. In Japan October 28, 1932

6 Claims. (Cl. 260—108)

This invention relates to the process for the manufacture of para (or 2,5) diketocamphan carboxylic acid and hydroxy-oxo-camphan carboxylic acid, which comprises introducing carbon dioxide into para diketocamphan in the presence of a catalyzer.

The object of the invention is to obtain a new composition which has a cardiotonic action, and a good percentage of yield.

The inventors have discovered that a new composition can be manufactured when carbon dioxide is introduced into para-diketocamphan in the presence of an alkali metal as metallic sodium or potassium. This composition is a new chemical product and cannot be found in any literature so far as the inventors are aware. It consists of two components, the one being considered to be a composition to be called para (or 2,5) diketocamphan carboxylic acid, and the other 2-oxo-5-hydroxy camphan carboxylic acid or 2-hydroxy-5-oxo camphan carboxylic acid. Each of them has a cardiotonic action.

The process is described below in detail by way of an example.

10 parts in weight of para diketocamphan are dissolved in about 50 parts of an organic solvent such as xylol, toluol and benzol, to which is added 3 parts of metallic sodium or 4 parts of metallic potassium prepared in wire or powder form, and dry carbon dioxide is introduced thereinto. If the solution is kept at its boiling temperature a yellowish brown precipitate is gradually produced, and the reaction is completed when the greatest part of the metal has been destroyed.

In case this reaction is carried out under an elevated pressure, about 5 to 10 atmospheres, the duration of time required for the reaction is shortened compared to the case wherein the reaction is made under the normal pressure and at the same temperature.

The most effective temperature for the reaction is from 100° C. to 140° C.

In the next step the contents of the vessel is cooled, and the remaining metal is decomposed with small cakes of ice being added thereto. A quantity of cold water is added thereto, and the liquid should be stirred well. When the liquid is let alone for a time, the organic solvent and water solution separate into two layers due to the difference of gravities, and they can be separated from each other. The organic solvent still contains diketocamphan un-reacted, and 3 to 4 parts of the latter can be recovered from the solvent.

The alkaline water solution separated from the organic solvent is heated, and the small quantity of substances which precipitates in the solution is removed by washing with ether.

The third step consists in adding an inorganic acid such as sulphuric acid or hydrochloric acid to the alkaline solution so as to make the latter acidic, and the acidic material thus produced is taken up by ether. When water is removed from the solution, it is evaporated and 6 to 7 parts of an intermediate product is obtained.

This product is a yellow oily material and is not a single substance. It can be separated into at least two new substances by the following steps.

When this material is treated with about 5 times its quantity of benzol, prismatic crystals having a melting point of 210°–212° C. are obtained. This substance has a molecular formula, $C_{11}H_{14}O_4$, and its alcoholic solution is coloured blue when it is treated with ferric chloride. When it is decomposed by heat, carbon-dioxide and para-diketocamphan are produced. Its chemical construction is considered to be I or II.

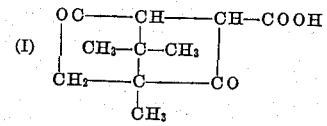

Para-diketocamphan carboxylic acid (3)

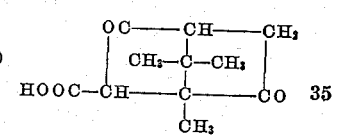

Para-diketocamphan carboxylic acid (6)

The remaining part of the above mentioned liquid from which the crystals have been excluded, contains another substance which can be purified as a salt of an alkaloid in the following manner.

Water is added to the remaining part and a quantity of an alkali is added thereto so as to obtain a water solution of an alkaline salt. Next, water solution of quinine hydro chloride or cinchonin hydrochloride is added to the solution, then the required substance precipitates as a salt of alkaloid. This salt should be purified several times from acetone, and after it has been decomposed with acid, the substance can be taken up by ether. This final substance has a melting point of 130°–132° C. and its molecular formula is $C_{11}H_{16}O_4$.

A water solution or alcoholic solution of this substance shows a purple red coloration when it is treated with ferric chloride. Its chemical construction is considered to be III or IV.

(III) 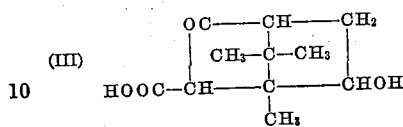

(IV) 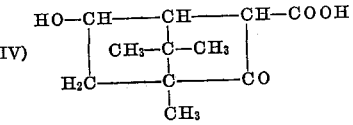

2-hydroxy-5-oxo camphan carboxylic acid (6)   2-oxo-5-hydroxy camphan carboxylic acid (3)

What we claim is:

1. A process for manufacturing a new composition containing para diketocamphan carboxylic acid and hydroxy-oxo-camphan carboxylic acid, which comprises introducing carbon dioxide into para diketocamphan in the presence of an alkali metal.

2. A process for manufacturing a new composition containing para diketocamphan carboxylic acid and hydroxy-oxo-camphan carboxylic acid, which comprises introducing carbon dioxide into a solution of para-diketocamphan dissolved in an organic solvent in the presence of an alkali metal.

3. A process for manufacturing a new composition containing para-diketocamphan carboxylic acid and hydroxy-oxo-camphan carboxylic acid, which comprises introducing carbon dioxide into para diketocamphan in the presence of an alkali metal, at a temperature of 100° C. to 140° C.

4. A process for the manufacture of a new composition containing para-diketocamphan carboxylic acid and hydroxy-oxo-camphan carboxylic acid, which comprises introducing carbon dioxide into para diketocamphan in the presence of an alkali metal, under a pressure between, 5 to 10 atmospheres.

5. A process for the manufacture of para-diketocamphan carboxylic acid which comprises manufacturing a composition containing para-diketocamphan carboxylic acid and hydroxy-oxo-camphan carboxylic acid by introducing carbon dioxide into para diketocamphan in the presence of an alkali metal, treating the composition with benzol and collecting the crystals produced therein.

6. A process for the manufacture of hydroxy-oxo-camphan carboxylic acid which comprises manufacturing a composition containing a mixture of para-diketocamphan carboxylic acid and hydroxy-oxo-camphan carboxylic acid by introducing carbon dioxide into para diketocamphan in the presence of an alkali metal, treating the composition with benzol, removing crystals produced therein, treating the remaining liquid with an alkaloid and purifying the product with an organic solvent.

KENZO TAMURA.
GYOKUJO KIHARA.
YASUHIKO ASAHINA.
MORIZO ISHIDATE.